United States Patent
Mauritz et al.

(10) Patent No.: US 7,346,099 B2
(45) Date of Patent: Mar. 18, 2008

(54) NETWORK FABRIC PHYSICAL LAYER

(75) Inventors: Karl H. Mauritz, Chandler, AZ (US); Todd C. Langley, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 10/039,248

(22) Filed: Jan. 3, 2002

(65) Prior Publication Data

US 2003/0123532 A1    Jul. 3, 2003

(51) Int. Cl.
*H04B 1/38* (2006.01)
*H04L 5/16* (2006.01)

(52) U.S. Cl. .............. 375/219; 375/220; 375/294; 375/327; 326/30

(58) Field of Classification Search ........ 375/219–288, 375/327–376, 294; 326/30
See application file for complete search history.

(56) References Cited

U.S. PATENT DOCUMENTS

| | | | |
|---|---|---|---|
| 4,571,735 A * | 2/1986 | Furse | 375/293 |
| 4,584,695 A * | 4/1986 | Wong et al. | 375/327 |
| 4,850,044 A | 7/1989 | Block et al. | |
| 4,875,208 A | 10/1989 | Furuhashi et al. | |
| 5,146,121 A * | 9/1992 | Searles et al. | 327/276 |
| 5,204,866 A | 4/1993 | Block et al. | |
| 5,235,617 A * | 8/1993 | Mallard, Jr. | 375/288 |
| 5,412,697 A | 5/1995 | Van Brunt et al. | |
| 5,436,897 A | 7/1995 | Cook | |
| 5,491,729 A * | 2/1996 | Co et al. | 375/376 |
| 5,513,322 A | 4/1996 | Hou | |
| 5,537,394 A | 7/1996 | Abe et al. | |
| 5,548,772 A | 8/1996 | Lin et al. | |
| 5,619,541 A | 4/1997 | Van Brunt et al. | |
| 5,797,035 A | 8/1998 | Birrittella et al. | |
| 5,838,663 A | 11/1998 | Elwalid et al. | |
| 5,881,247 A | 3/1999 | Dombrosky et al. | |
| 5,964,845 A | 10/1999 | Braun et al. | |
| 6,008,734 A | 12/1999 | Lowe | |
| 6,011,804 A | 1/2000 | Bertin et al. | |
| 6,038,355 A | 3/2000 | Bishop | |
| 6,049,524 A | 4/2000 | Fukushima et al. | |

(Continued)

FOREIGN PATENT DOCUMENTS

EP    0597583 A1    5/1994

OTHER PUBLICATIONS

Vadya, A.S., "Lapse: a recipe for high performance adaptive router design" High-Performance Computer Architecture, 1999. Jan. 1999, Los Alamitos, CA IEEE Compt. Soc. US, pp. 236-242.

*Primary Examiner*—Ted Wang
(74) *Attorney, Agent, or Firm*—Blakely, Sokoloff, Taylor & Zafman LLP

(57) ABSTRACT

A network fabric physical layer includes a driver coupled to a receiver via a bus, which implements a multiphase encoded protocol. A multiphase sequencer sequences (data or command/control) words for the driver. The driver outputs the sequenced words onto the bus as a differential multiphase encoded waveform. The receiver receives the differential multiphase encoded waveform and performs statistical analysis to determine data integrity checking. The bus is a concurrent differential bi-directional bus and each transmitting driver includes impedance compensation circuitry on both ends of a transmission line so that each drives its signal value with the impedance characteristics of the transmission line. The receiver also includes jitter immunity.

13 Claims, 8 Drawing Sheets

U.S. PATENT DOCUMENTS

| | | |
|---|---|---|
| 6,085,270 A | 7/2000 | Gulick |
| 6,147,971 A | 11/2000 | Rochberger et al. |
| 6,246,669 B1 | 6/2001 | Chevalier et al. |
| 6,269,076 B1 | 7/2001 | Shamir et al. |
| 6,324,603 B1 | 11/2001 | Niizuma et al. |
| 6,338,127 B1 | 1/2002 | Manning |
| 6,351,191 B1 * | 2/2002 | Nair et al. .................... 331/57 |
| 6,374,360 B1 | 4/2002 | Keeth et al. |
| 6,404,771 B1 | 6/2002 | Gulick |
| 6,426,943 B1 | 7/2002 | Spinney et al. |
| 6,442,644 B1 | 8/2002 | Gustavson et al. |
| 6,480,946 B1 * | 11/2002 | Tomishima et al. ......... 711/167 |
| 6,496,510 B1 | 12/2002 | Tsukakoshi et al. |
| 6,577,653 B1 | 6/2003 | Rochberger et al. |
| 6,594,284 B1 | 7/2003 | Page et al. |
| 6,611,247 B1 * | 8/2003 | Chang et al. .................. 345/99 |
| 6,614,757 B1 | 9/2003 | Rochberger et al. |
| 6,650,844 B1 | 11/2003 | Davies et al. |
| 6,665,317 B1 | 12/2003 | Scott |
| 6,690,851 B1 | 2/2004 | Guilfoyle |
| 6,697,325 B1 | 2/2004 | Cain |
| 6,704,882 B2 | 3/2004 | Zabinski et al. |
| 6,735,709 B1 | 5/2004 | Lee et al. |
| 6,763,390 B1 | 7/2004 | Kovacevic et al. |
| 6,771,845 B2 | 8/2004 | Levy et al. |
| 6,775,480 B1 | 8/2004 | Goodwill |
| 6,789,209 B1 * | 9/2004 | Suzuki et al. ................ 713/401 |
| 6,996,632 B2 * | 2/2006 | Levy et al. .................. 709/248 |
| 2002/0031042 A1 * | 3/2002 | Kim et al. ................... 365/233 |
| 2003/0063677 A1 * | 4/2003 | Mix et al. .................... 375/259 |

* cited by examiner

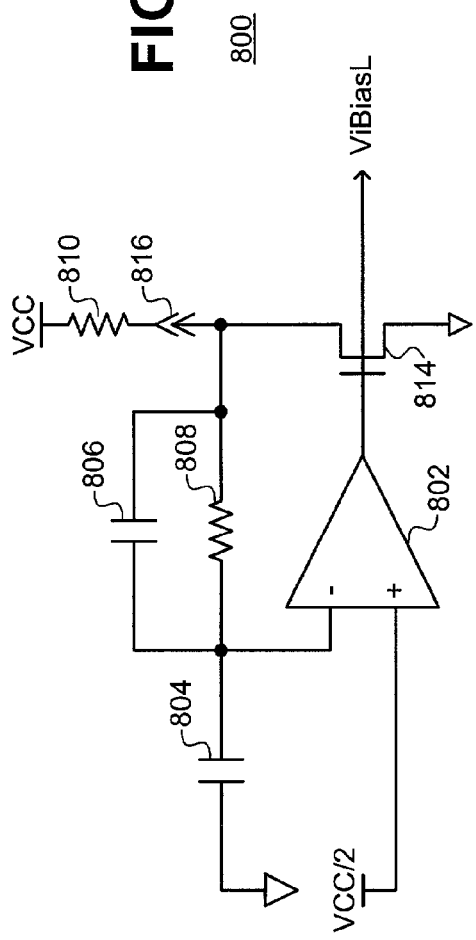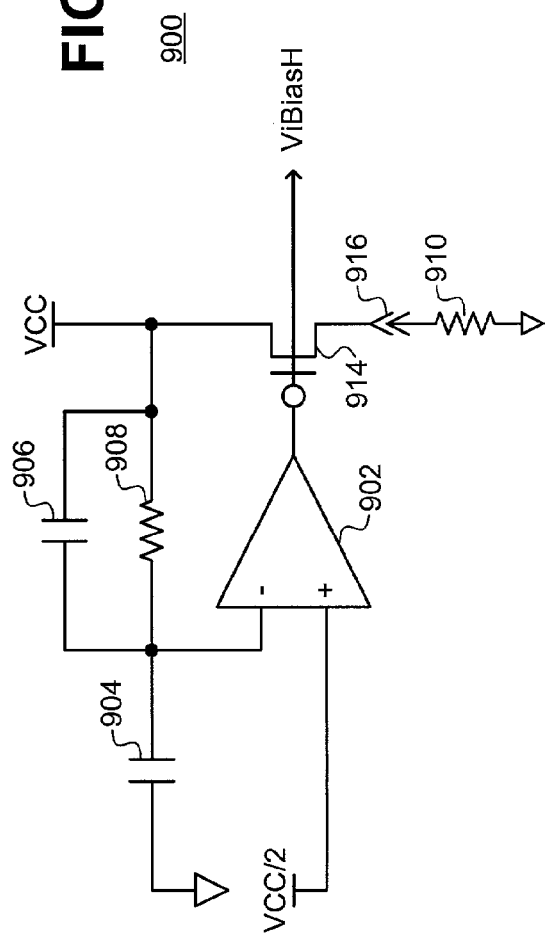

NETWORK FABRIC PHYSICAL LAYER

RELATED APPLICATIONS

The present application is related to:

U.S. patent application Ser. No. 09/822,970, filed Mar. 29, 2001, titled "Open Air Optical Channel," now U.S. Pat. No. 6,771,845, issued Aug. 3, 2004;

U.S. patent application Ser. No. 09/885,394, filed Jun. 19, 2001, titled "Multiphase Encoded Protocol and Synchronization of Buses,";

U.S. patent application Ser. No. 09/908,273, filed Jul. 17, 2001, titled "Network Fabric Processing,";

U.S. patent application Ser. No. 09/908,259, filed Jul. 17, 2001, titled "Extensible Fabric Protocol Bus," now U.S. Pat. No. 6,853,620, issued Feb. 8, 2005.

BACKGROUND OF THE INVENTION

1. Field of the Invention

The present invention is related to networks and, in particular to physical layer functions of networks.

2. Background Information

The term "network fabric" describes the physical structure of a network. Communication channels are interwoven from port to port such that network devices can be connected together to exchange information. Communications take place in many networks today in accordance with the well-known Open System Interconnection (OSI) reference model.

The OSI reference mode consists of seven layers, each of which specifies particular network functions such as addressing, flow control, error control, encapsulation, and reliable message transfer. For example, the physical layer (Layer 1) is closest to the transmission media technology (e.g., fiber-optic, copper) and is responsible for electrical, optical, mechanical requirements for connecting to the media. As such, the physical layer is responsible for voltages, currents, impedances, pin configurations, and handshaking procedures utilized by network elements.

The physical layer deals with signaling. Signaling generally concerns how the network controls access to the transmission media by network elements. For example, the physical layer translates logical "ones" and logical "zeros" into electrical or optical signals and places the signals onto the network transmission media for extraction or sampling by destination network elements. Translation of logical "ones" and logical "zeros" into electrical or optical signals is sometimes referred to as "encoding."

The physical layer also deals with topology and hardware. Topology is the physical layout of devices and media within a network and hardware includes the physical layer devices (or nodes). Common network topologies include a linear bus topology, a star bus topology, a ring topology, and a mesh topology, in which devices are connected to a bus in a linear, star, ring, or mesh arrangement, respectively. Physical layer devices also deal with basis signaling. Common physical layer devices include drivers, receivers, transceivers, and similar devices.

Today's high-speed buses are capable of operation in the Gigahertz (GHz) range. However, current network fabric physical functions tend to be limited in their support communication between processes and devices across the transmission media at such high frequencies.

BRIEF DESCRIPTION OF THE FIGURES

The invention is best understood by reference to the figures wherein references with like reference numbers generally indicate identical, functionally similar, and/or structurally similar elements. The drawing in which an element first appears is indicated by the leftmost digit(s) in the reference number in which:

FIG. 8 is a schematic diagram of an example impedance compensation circuit according to embodiments of the present invention;

FIG. 9 is a schematic diagram of another example impedance compensation circuit according to embodiments of the present invention.

DETAILED DESCRIPTION OF THE ILLUSTRATED EMBODIMENTS

Figure 1:
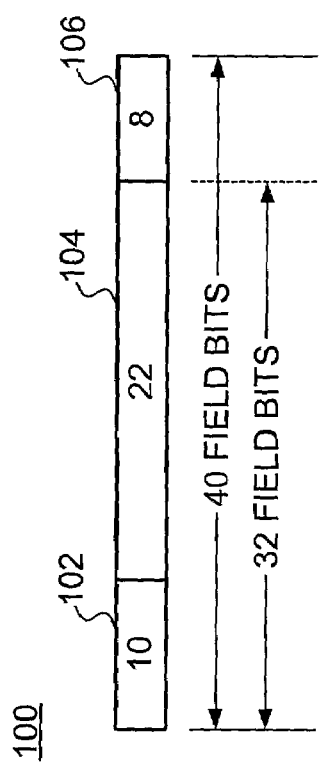
FIG. 1 is a graphical representation of an example multiphase encoded protocol according to an embodiment of the present invention.

A multiphase encoded protocol and synchronization of buses, including frames, channels, etc., implementing a multiphase encoded protocol is described herein. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as bus, bits, clock, command, and so forth. These terms are commonly employed by those skilled in the art to convey the substance of their work to others skilled in the art. As used herein, the word "line" refers to a single line having a multiphasic property. According to an embodiment, a multiphasic property is a condition in which a single line is made up of two or more data field bits with one or more command/control field bits in a sequence. Per line, either a data field bit or a command/control field bit is defined not both at the same time. For a bus, if any line has a command/control field bit set, then all the information on the bus on any line for that clock edge defines a command.

Other parts of the description will be presented in terms of operations performed by a network, using terms such as encoding, receiving, transmitting, and so forth. As is well understood by those skilled in the art, these quantities and operations take the form of electrical, magnetic, or optical signals capable of being stored, transferred, combined, and otherwise manipulated through mechanical and electrical components of a network; and the term "network" includes general purpose as well as special purpose data processing machines, systems, and the like, that are standalone, adjunct or embedded.

Various operations will be described as multiple discrete blocks performed in turn in a manner that is most helpful in understanding the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention is directed to a multiphase encoded protocol, which as the number of lines on a bus implementing the protocol increases, the number of command/control words increases exponentially above the number of data words. For example, using a multiphase encoded protocol, two lines can carry sixteen ($2^4$) variations of data words and the same lines can carry twenty variations of command/control words. Ten lines can carry 1,048,576 ($2^{20}$) variations of data words and 6,553,600 or more variations of command/control words. Sixteen lines can carry 4,294,967,296 ($2^{32}$) variations of data words and 42,949,672,960 or more variations of command/control words.

There are several advantages of a multiphase encoded protocol according to embodiments of the present invention. One advantage is that the structure of data and command allows a unique signature to be part of the protocol for easy identification, which simplifies the hardware implementations and decreases network overhead. For example, the multiphase encoded protocol allows a simplified electrical to optical and optical to electrical interface to be created.

Another advantage of multiphase encoded protocol is a decreased risk of burning the optical transducer with high, narrow pulses. This is because a multiphase encoded protocol permits pulse packing in which increased information density is applied to an optical transducer.

Still another advantage to multiphase encoded protocol is that because the size of the command/control vocabulary tends to dictate the variety of functions (e.g., commands and controls) the bus can handle, a multiphase encoded protocol according to embodiments of the present invention allows new instruction sets to be created using software, which is useful for expandability purposes.

Of course, the present invention is not limited by the number of phases in multiphase encoding. For instance, Table 1 lists example numbers of lines (and field bits) and their corresponding number of command words and/or data words transferred.

TABLE 1

| Number of lines per bus | Transfer Commands | Data | Number of lines per bus | Transfer Commands | Data |
|---|---|---|---|---|---|
| 1 | 2 | 4 | 9 | >1,474,560 | 2,621,144 |
| 2 | 20 | 16 | 10 | >6,553,600 | 1,048,576 |
| 3 | 144 | 64 | 11 | >28,853,840 | 4,194,304 |
| 4 | 640 | 256 | 12 | >125,829,120 | 16,777,216 |
| 5 | 3,200 | 1024 | 13 | >545,259,520 | 67,108,864 |
| 6 | 15,360 | 4096 | 14 | >2,348,810,240 | 268,435,456 |
| 7 | 71,680 | 16384 | 15 | >10,066,329,600 | 1,073,741,842 |
| 8 | 32,7680 | 655,536 | 16 | >42,949,672,960 | 4,294,967,296 |

Note that the number of permutations for command/control words is much higher than the permutations for data words. Note also that 6,553,600 command/control words is more words than are currently present in the English language and that 42,949,672,960 command/control words is more words than are currently present in all existing languages combined. This density of commands allows a rich language to be realized. This richness of command/control words in a multiphase encoded protocol increases when two data field bits and two command/control field bits are used or three data field bits and three command/control field bits are used, and so on.

FIG. 1 is a graphical representation of an example multiphase encoded protocol 100 according to an embodiment of the present invention. The example protocol 100 uses forty field bits, for example, including ten, for example, field bits ($D_0$–$D_9$) dedicated to command/control words (command/control field bits 102), twenty-two (for example) field bits (data field bits 104) dedicated to data, addressing, and/or other functions, and eight, for example, field bits dedicated to error correction (ECC field bits 106). The command/control field bits 102 hold the purpose or functional information for remaining field bits in the protocol 100. In this embodiment, with ten command/control field bits, it is possible to have 6,553,600 command/control words to choose from per clock. Forty field bits also allows four sets of (ten field bit) command/control field bits 100, which equates to four command/control words. When any field bit in the forty field bits has a command/control field bit active the entire forty field bits represent a command/control structure.

According to embodiments of the present invention, the multiphase encoded protocol 100 is a seven-phase encoded protocol. Seven-phase encoding is defined as having the possibility of two data field bits or one command/control field bit per clock edge. In seven-phase encoding, the dropping of the falling edge in relation to the rising clock edge defines the two bits of data (00, 01, 10, 11) or one command/control field bit (0 or 1). The command/control field bits 102 include $C_0, C_1$ bit definitions and the data field bits 104 are related to 00, 01, 10, 11 data field bits. All bits with $C_0$ bit set alternating with $C_1$ bit set represents IDLE mode. This allows multiphase encoding to null out bus skews. The IDLE mode includes n lines with all $C_0$ bits set followed by one or more lines with $C_1$ bit set in repeating cycles. This allows logic to be created that can null out bus skews that exceed more than one clock interval.

Of course, the present invention is not limited by the number of phases in multiphase encoding. For instance, according to other embodiments of the present invention, the multiphase encoded protocol 100 may be a nine-phase encoded protocol. Nine-phase encoding is defined as having the possibility of two data field bits or two command/control field bits per clock edge. The dropping of the falling edge in relation to the rising clock edge defines the two bits of data (00, 01, 10, 11) or two bits of command (00, 01, 10, 11).

Alternatively, the multiphase encoded protocol 100 may be an eleven-phase encoded protocol. Eleven-phase encoding is defined as having the possibility of three data field bits or one command/control field bit per clock edge. The dropping of the falling edge in relation to the rising clock edge defines the three bits of data (000, 001, 010, 011, 100, 101, 110, 111) or one command/control field bit (0 or 1).

Alternatively still, the multiphase encoded protocol 100 may be a thirteen-phase encoded protocol. Thirteen-phase encoding is defined as having the possibility of three data field bits or two command/control field bits per clock edge. The dropping of the falling edge in relation to the rising clock edge defines the three bits of data (000, 001, 010, 011, 100, 101, 110, 111) or two bits of command (00, 01, 10, 11). Reading the description herein, it will be apparent to persons of ordinary skill in the art how to implement other multiphase encoded protocols in accordance with the present invention.

Figure 2:
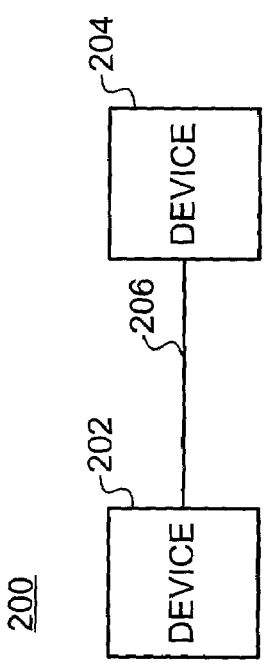
FIG. 2 is a schematic diagram of an example network suitable for implementing embodiments of the present invention.

The present invention is also directed to one or more architectural implementations of a multiphase encoded protocol (e.g., the multiphase encoded protocol 100) and synchronization of channels on a bus. FIG. 2 is a schematic diagram of an example network 200 suitable for implementing embodiments of the present invention. The example network 200 includes at least two devices (202, 204) that transmit and receive data to/from each other via a bus 206. The bus 206 is coupled between the devices 202 and 204 to permit the devices 202 and 204 to exchange data and command/control information with each other utilizing the multiphase encoded protocol 100.

In one embodiment, the devices 202 and 204 may be processors, which perform conventional functions of executing programming instructions including implementing many of the teachings of the present invention. For example, the devices 202 and 204 may be processors of the Pentium® processor family available from Intel Corporation of Santa Clara, Calif. Although only two devices (202 and 204) are shown, embodiments of the present invention may be implemented using more than two devices.

Command and/or control information may be transmitted with data at any time, which increases efficiency across the bus 206. Data and command/control information determine how the (follow-on or previous) data should be processed. When more data and command/control information are exchanged, how the (follow-on or previous) data should be processed may change.

Figure 3:
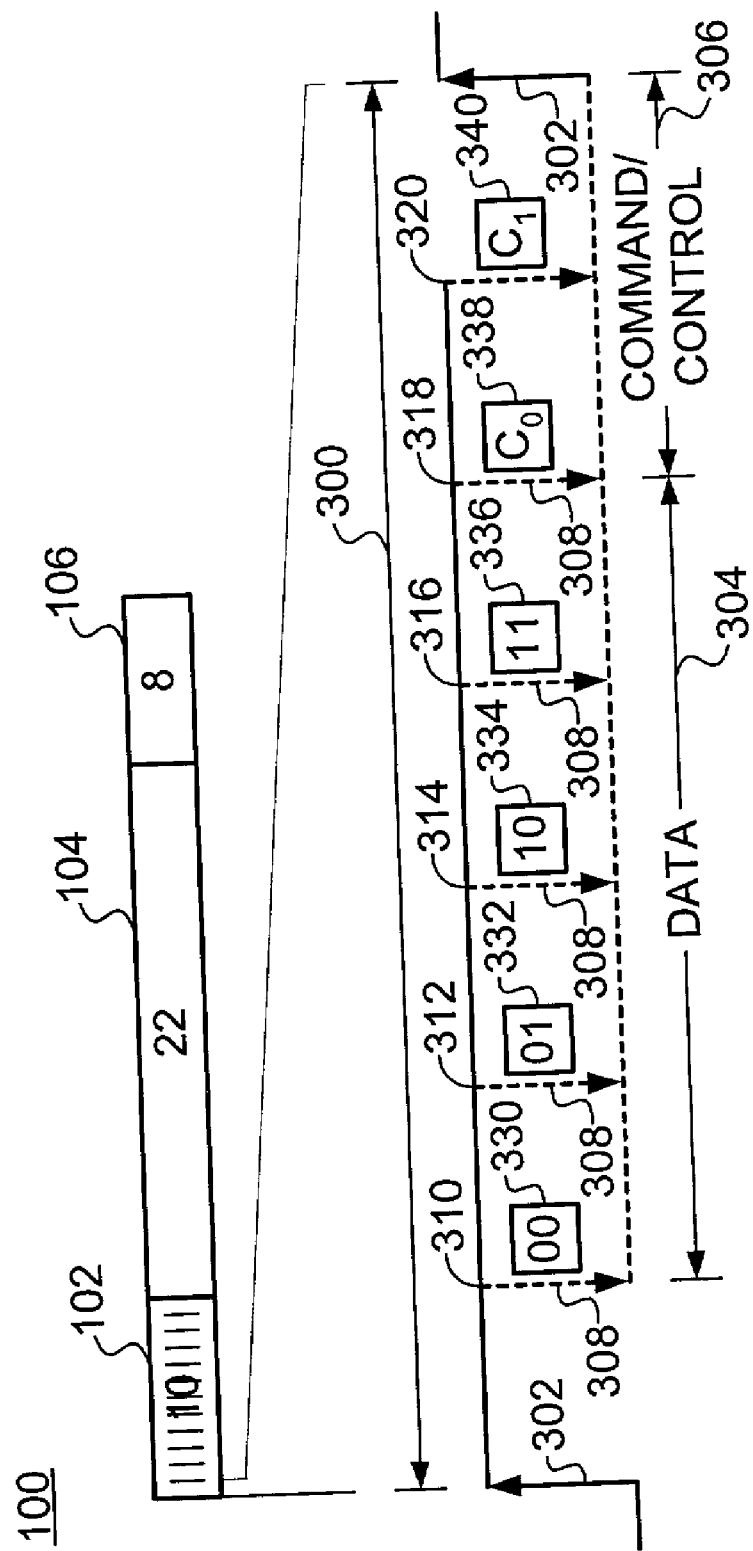
FIG. 3 is a graphical representation of a multiphase encoded frame on a line in the bus of FIG. 2 according to embodiments of the present invention.

Embodiments of the present invention synchronize frames exchanged by devices on the bus 206. FIG. 3 is a graphical representation of a frame 300 transmitting on a line in the bus 206 using a multiphase encoded protocol according to embodiments of the present invention. FIG. 3 shows the frame 300 in relation to the multiphase encoded protocol 100, which shows that a single frame 300 corresponds to a single field bit in the multiphase encoded protocol 100. For example, there may be one frame 300 for each of the command/control field bits 102, data field bits 104, or ECC field bits 106.

In the embodiment shown, two rising edges 302, a data structure 304, at least one command/control structure 306, and at least one falling edge 308 bound the frame 300. Each rising edge 302 indicates a clock. The frame 300 (e.g. data structure 304, command/control structure 306, and clock) may be a computer data signal embodied in a carrier wave transmitted and received over the bus 206.

The command/control structure 306 in relationship to the data structure 304 defines the information on the data bus of the bus 206. The rising edge 302 (clock) for each field bit defines the synchronization of all lines on the bus 206. For every command/control word, the data structure 304 meaning is redefined at the time of the clock. The multiphase encoding of the waveform in the frame 300 allows multiple logical states and their function to be determined while using the initial rising edge of the waveform as the synchronizing clock.

For lines that balance the charge on a transmission line, the rising and falling edges can be reversed. For example, a command is sent to the receiver stating a reversal of rise/fall. This allows the receiver to reverse its logic also.

The relationship between clock and data can be derived and compensated for in the receiving unit. A receiving device (202, 204) uses the rising edge 302 (clock) to adjust the phase of one or more incoming frames 300 to synchronize the frames 300 with each other. The clock is thus embedded in the multiphase encoded protocol.

In one embodiment, a falling edge 308 indicates that the structure that follows the falling edge 308 is a data structure 304 or a command/control structure 306. When a falling edge 308 occurs at one predetermined point (310, 312, 314, or 316) in the frame 300, the structure that follows the falling edge 308 is a data structure 304 and the information being transmitted and received is a data. When a falling edge 308 occurs at another predetermined point (318 or 320) in the frame 300, the structure that follows the falling edge 308 is a command/control structure 306 and the information being transmitted and received is command and/or control information. When a falling edge 308 occurs at the predetermined point 318, the command/control structure 306 indicates one command ($C_0$). When a falling edge 308 occurs at the predetermined point 320, the command/control structure 306 indicates another one command ($C_1$).

The data structure 304 and the command/control structure 306 each include a predetermined number of data/command/control field bits. Each bit field includes a predetermined number of data/command/control field bits. In an embodiment in which the multiphase encoded protocol 100 is a seven-phase protocol, each data structure has a $D_0$, $D_1$=two bits of data or one bit of command C. A command set in any line makes the bus a command/control function. In this embodiment, on a two-line bus, the first line of $D_0$ is $D^1_0$ and $D_1$ is $D^1_1$. The command/control field bit is $C^1$. The second line is $D^2_0$ and $D^2_1$, and the command/control field bit is $C^2$. Then, taking the command for each line at a time with the other line two data bits at a time,:

$C^1=0$ with $D^2_0 D^2_1$ ranging from 00 to 11 of the $2^{nd}$ line=4 variation;

$C^1=1$ with $D^2_0 D^2_1$ ranging from 00 to 11 of the $2^{nd}$ line=4 variation;

$C^2=0$ with $D^1_0 D^1_1$ ranging from 00 to 11 of the $1^{st}$ line=4 variation;

$C^2=1$ with $D^1_0 D^1_1$ ranging from 00 to 11 of the $1^{st}$ line=4 variation; and $C^1=0$ $C^2=0$, $C^1=0$ $C^2=1$, $C^1=1$ $C^2=0$, $C^1=1$ $C^2=1$ is 4 variations.

In this embodiment, a total of twenty variations for command/control words and sixteen variations for data words of two lines with four bits. Of course, this concept can be extended to any bus width, as Table 1 above shows.

The data structure 304 and the command/control structure 306 also each include a predetermined number of error correction and detection (ECC) bits, which may be used for 8B/10B encoding purposes. The ECC bits may not be necessary for certain buses. Also, for 10B coding, ECC may not be required and can be used to extend the bus width.

In one embodiment, the first transfer of a frame 300 is a command/control structure 306, which may be followed by additional command/control structures to clarify any constraints on the contents of the frame 300. Packets of data structures 304, which may or may not include ECC bits, may then follow the frame 300.

Each connection to the bus 206 includes a driver and a receiver. The driver constructs the data to be transmitted into multiphase encoded frames. The drivers in the device 202 are coupled to the receivers in the device 204 via transmission lines in the bus 206. The drivers in the device 204 are coupled to the receivers in the device 202 via transmission lines in the bus 206. The drivers and receivers may be single ended drivers and differential receivers having a common reference line. Both drivers and receivers from the devices 202 to 204 can reside on the same differential bus if each receiver nulls out its own driver voltage and the driver impedance is equal to the transmission line impedance.

Conventional networks may require clock extraction for each channel entering the system. Synchronization of data takes place after de-serialization. Because each channel is its own clock domain, all channels must be synchronized to some internal clock for each transmitter (in the device 202 and/or 204). According to embodiments of the present invention, the network 200 provides a system clock and synchronization. Each driver (in the device 202 and/or 204) may include a seven-phase phase-lock loop (PLL) for its decomposition of command/control or data onto a multiphase encoding stream. The receiver may include a delay-lock loop (DLL) for post de-serialization of data or command/control. For example, channel-to-channel synchronization is accomplished with DLL devices at the receivers that are kept in phase using one-bit multiplier flip-flops. The one-bit multiplier flip-flops are used as correlation elements that provide the feedback into slaved DLL devices. The master DLL output provides the system clock. The synchronization of each slaved DLL realized by the one-bit multiplier flip-flops permits precise phase tracking to the master DLL. All command/control structures and data structures are synchronized to the system clock.

On the receive end, each receiver extracts its own data from the bus 206. The receiver then uses the rising edge 302 in the data as a clock edge to extract the protocol embedded data or commands. This process eliminates clock-to-data skew and jitter because the rising edge 302 was used to format the embedded data that follows the rising edge 302.

These features provide phase alignment for successful data extraction from several optical fibers. These features also allow very wide bandwidths to be achieved without the additional overhead required by conventional 8B/10B encoded systems. This is because multiple fibers may be combined onto the optical bus 206, which moves the data path bottleneck out of the data channel.

In one embodiment, the bus 206 is coupled between the devices (202, 204) to exchange data and control information in multiphase encoded frames. In this embodiment, each frame may be encoded such that multiple phases of the frame allow multiple logic states and their functions to be determined using the initial rising edge of the frame as a synchronizing clock. Each device (202, 206) encodes data prior to transmitting and decodes the encoded data upon receipt.

Each frame is bounded by any two rising edges 302. The rising edges 302 generate the system clock. The timing location of a falling edge 308 defines the contents of the frame. The frame is subdivided into data zones (e.g., six data zones). Falling edges 308 drop in one of the data zones. The data zones are defined as 00, 01, 10, 11, Command 0, and Command 1. A falling edge 308 is a linear progression from one state to the next state related from the rising edge 302 (clock). A window function may be used to compensate for edge placement uncertainty.

Figure 4:
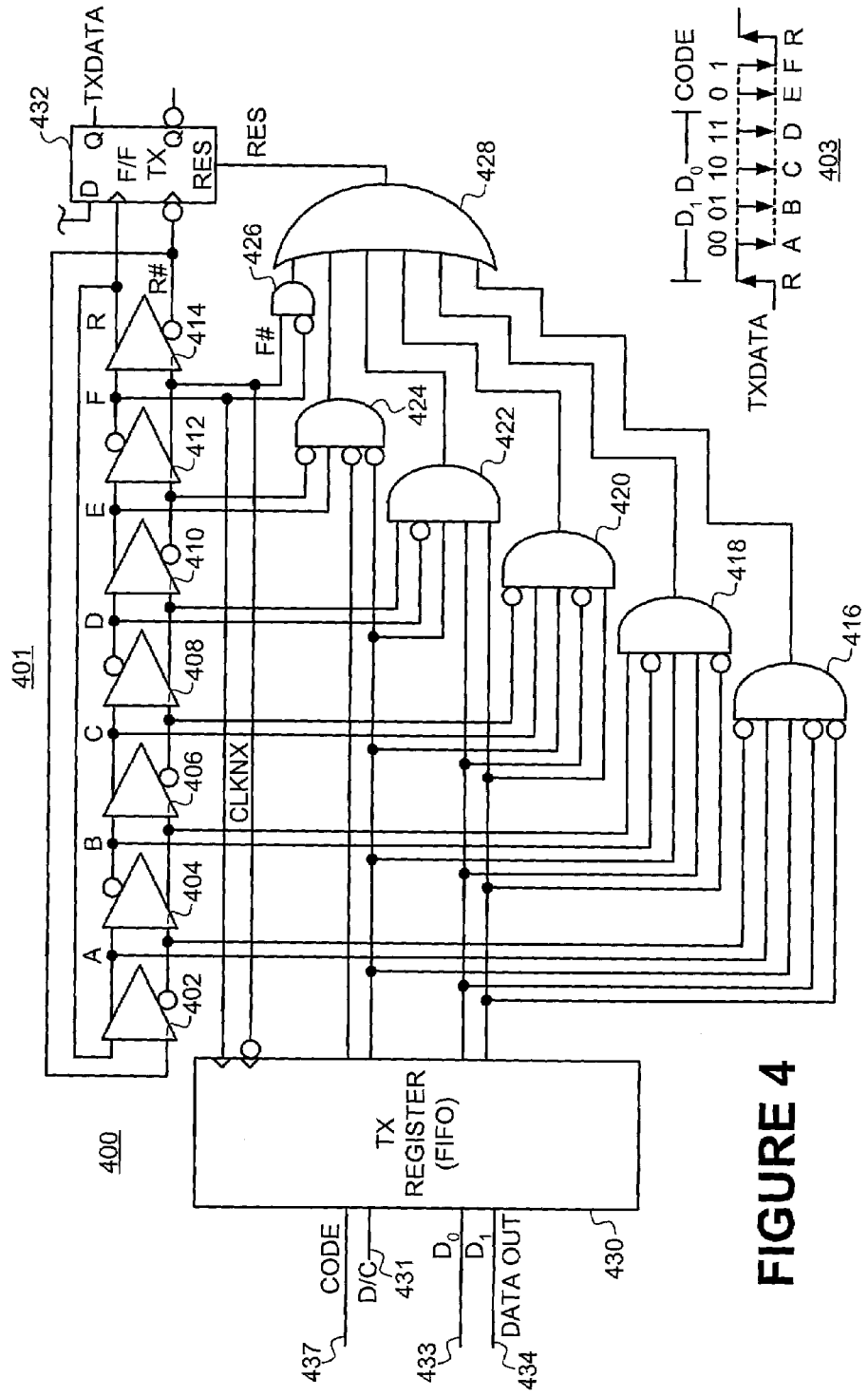
FIG. 4 is a schematic diagram of a seven-phase driver sequencer according to embodiments of the present invention.

FIG. 4 is a schematic diagram of a seven-phase sequencer 400 according to an embodiment of the present invention. The example sequencer 400 generates a multiphase encoded waveform 403 that includes the rising edge 302 and the falling edge 308. In one embodiment, the timing from rising edge 302 to rising edge 302 may be eight hundred picoseconds. Of course, other timing is possible.

The example sequencer 400 sequences data words and/or command/control words to generate the multiphase encoded TXDATA waveform 403. The example sequencer 400 includes an input register 430 coupled to a multiple phase (multiphase) PLL 401. The multiphase PLL 401 in the illustrated sequencer 400 includes seven differential input/output amplifiers 402, 404, 406, 408, 410, 412, and 414, each of which may have minimum swing, and seven gates 416, 418, 420, 422, 424, 426, and 428. The multiphase PLL 401 may be shared between multiple field bits or may be defined per bit field.

Data words and/or command/control (code) words are applied to the input register 430, which includes a D/C (data/command) control line 431, data-out lines 433 and 434 for the two bits of data-out $D_0$ and $D_1$, and at least one code line 437 for the bit of command/control code that can take on a value of 0 or 1.

The seven phases are represented by phases A, B, C, D, E, F, and R, which are points at which the multiphase encoded waveform TXDATA 403 includes a falling edge 308. The two bits of data-out $D_0$ and $D_1$ are used to reset the flip-flop 432 at the correct phase or, if a D/C input to the input register 430 is set to command, then the input bit on the code line 437 sets the phase for command/control output. If the two bits of data-out $D_0$ and $D_1$ are "00," the multiphase encoded TXDATA waveform 403 has a falling edge 308 at the point A and stays low until the end of the A phase. Similarly, if the two bits of data-out $D_0$ and $D_1$ are "01," the multiphase encoded waveform 403 has a falling edge 308 at the point B, if the two bits of data-out $D_0$ and $D_1$ are "10," the multiphase encoded waveform 403 has a falling edge 308 at the point C, and if the two bits of data-out $D_0$ and $D_1$ are "11," the multiphase encoded waveform 403 has a falling edge 308 at the point D, and stays low until the end of the B, C, and D phases, respectively.

On a command that is to be transmitted, the multiphase encoded TXDATA waveform 403 has a falling edge 308 at the point E for a command of Code="0" on the code line 437. For a command of Code="1" on the code line 437 the multiphase encoded TXDATA waveform 403 has a falling edge 308 at the point F and the multiphase encoded TXDATA waveform 403 starts over for the next output.

The R phase sets a flip-flop 432 to a high condition to start the multiphase encoded TXDATA waveform 403. The multiphase PLL 401 is a differential PLL where for example: The phase R and R# phases may be minimum swing differential signaling to decrease noise and jitter. The same is true for the points A, B, C, D, E, F. A falling edge 308 in the multiphase encoded TXDATA waveform 403 at the point R or R# loads the input data register 430 with data-out $D_0$, $D_1$, D/C, and code values. The falling edge 308 is a linear progression from a rising edge 302 to the next rising edge 302.

In the embodiment shown in FIG. 4, the rising edge 302 and the corresponding falling edge 308 of the multiphase encoded waveform 403 have little cycle-to-cycle jitter because the rising edge 302 is phased to the falling edge 308. However, the embodiment in FIG. 4 may have a higher absolute jitter as defined by spread spectrum clocking input to the PLL. The spread spectrum clocking may allow electromagnetic interference (EMI) to be spread across the spectrum for lower EMI radiated energy.

Figure 5:
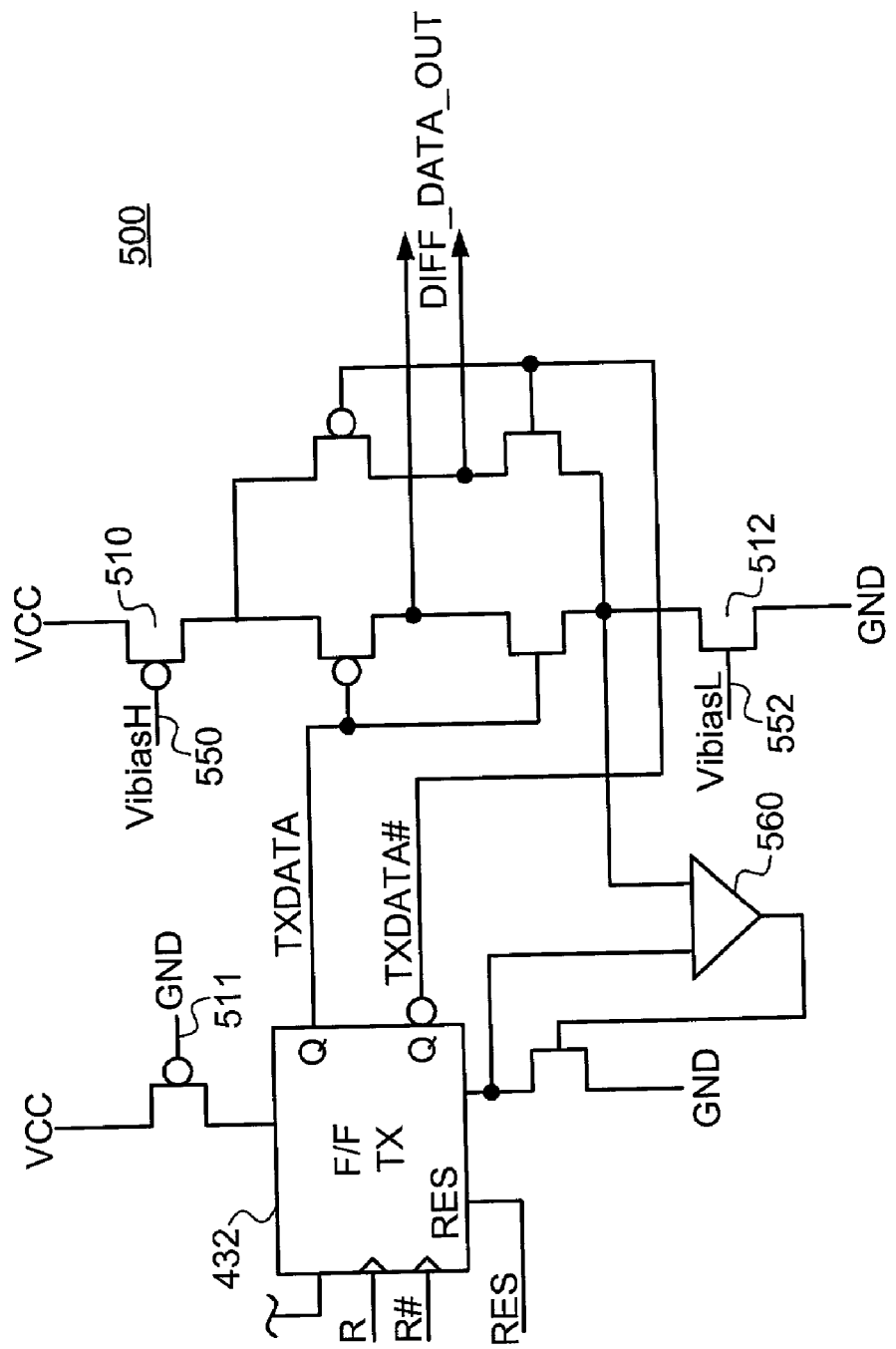
FIG. 5 is a schematic diagram of an example differential driver according to embodiments of the present invention.

FIG. 5 is a schematic diagram of an example differential driver 500 according to an embodiment of the present invention. The driver sequencer 500 output is sent to one or more differential drivers 500, which outputs the multiphase encoded frame(s) onto the bus with the same impedance as the physical bus.

The example differential driver 500 may be a concurrent bi-directional differential driver for the bus 206, which in this embodiment is a concurrent bi-directional differential bus such that data flows on the same transmission line in two different directions at the same time. The differential driver 500 operating voltage is $V_{CC}$.

The differential driver 500 outputs the multiphase encoded waveform 403 onto the differential line and enables transistors 510 and 512 to drive the outputs at the characteristic impedance. In one embodiment, the differential driver 500 drives a "0" or a "1" signal level onto a transmission line while the driver at the other end of the transmission line on the bus 206 also drives a "0" or a "1" signal level onto the transmission line. The combined voltage from the two drivers has a summation effect on the transmission line.

When both drivers are driving a signal level onto the transmission line, a voltage change appears on the bus 206. The voltage has three groupings depending on the data being driven on the bus 206. For example, if both drivers are driving a "0" onto the transmission line, the voltage appearing on the bus 206 is a predetermined value (e.g., a relatively low voltage). If one driver is driving a "0" onto the transmission line and the other driver is driving a "1" onto the bus 206, the voltage appearing on the bus 206 is a second predetermined value (e.g., a relatively midrange voltage). If both drivers are driving a "1" onto the transmission line, the voltage appearing on the bus 206 is a third predetermined value (e.g., a relatively high voltage). As described above, the receiver(s) at either end of the transmission line extracts out its own driving data from the summed resulting voltage on the bus 206 to determine its designated incoming data. The receiver(s) then uses the received data rising edge 302 as the clock edge to extract the multiphasic protocol imbedded data or commands.

However, the driver and receiver transmission lines also may be split. In this embodiment, to extract data, a receiver does not have to subtract its own driving potentials out first.

In one embodiment, if the differential driver 500 is driving a "0" onto the bus 206, the differential driver 500 places a voltage equivalent to $V_{CC}/4$ on the transmission line. If the differential driver 500 is driving a "1" onto the bus 206, the differential driver 500 places a voltage equivalent to $V_{CC}/2$ on the transmission line. The voltage is summed by the transmission line to $V_{CC}/8$ if both drivers are driving a "0" and to 0.75 $V_{CC}$ if both drivers are driving a "1" onto the bus 206. Because the transmission line is differential, one side of the transmission line drives a "true" signal value and the other side of the transmission line drives a "not true" signal value.

Of course, the present invention is not limited to the example voltages described above. For instance, Table 2 lists example voltage levels and corresponding signal values.

TABLE 2

| Driver #1 | Driver #2 Drives | Voltage on Transmission Line | Driver #2 Voltages– Driver #1 Voltages | Sign | Logical Signal Value |
|---|---|---|---|---|---|
| Logical "0" = $V_{CC}/4$ | Logical "0" = $V_{CC}/4$ | $V_{CC}/8$ | $(V_{CC}/8) - (V_{CC}/4)$ | – | "0" |
| Logical "0" = $V_{CC}/4$ | Logical "1" = $V_{CC}/2$ | (3) × $(V_{CC}/8)$ | (3) × $(V_{CC}/8) - (V_{CC}/4)$ | + | "1" |
| Logical "1" = $V_{CC}/2$ | Logical "0" = $V_{CC}/4$ | (3) × $(V_{CC}/8)$ | (3) × $(V_{CC}/8) - (V_{CC}/2)$ | – | "0" |
| Logical "1" = $V_{CC}/2$ | Logical "1" = $V_{CC}/2$ | (3) × $(V_{CC}/4)$ | (3) × $(V_{CC}/8) - (V_{CC}/2)$ | + | "1" |

The VibiasH and the VibiasL coupled to the transistors 510 and 512, respectively, are derived from an external resistance (shown in FIGS. 8 and 9 (810, 910) below) that has characteristic board impedance values. The differential driver 500 sets a current driving capability for the high driving side through VibiasH signal 550 and on the low driving side through the VibiasL signal 552. The VibiasH signal 550 and the VibiasL signal 552 set the characteristic driving impedance to match the transmission line characteristics.

An operational amplifier 560 reflects the driving node voltages to the transistors 512. The low drive voltage of the flip-flop 432 is at the same potential as the differential driver 500 voltage $V_{CC}$. This allows the differential driver 500 not to be saturated for faster output characteristics. A transistor 511 has a gain set to limit its high voltage saturation to the differential drivers 500. However, instead of using GND on the transistor 511, the VibiasH can be used, which allows the current drive to be modified to the differential transistors 510 and 512 to limit the saturation.

The R, R#, and Res signals come from the driver sequencer 500 logic, which also drives the flip-flop 432 for drive voltage selection in the differential receiver 400.

Both ends of a line are terminated into the characteristic impedance of the transmission line to decrease the noise and reflections on the transmission line. The transmitting drivers use impedance compensation circuitry on both ends of the transmission line so that each drives its signal value on the transmission line with the impedance characteristics of the transmission line. Suitable impedance compensation circuitry is described with respect to FIG. 8 and FIG. 9.

Figure 6:
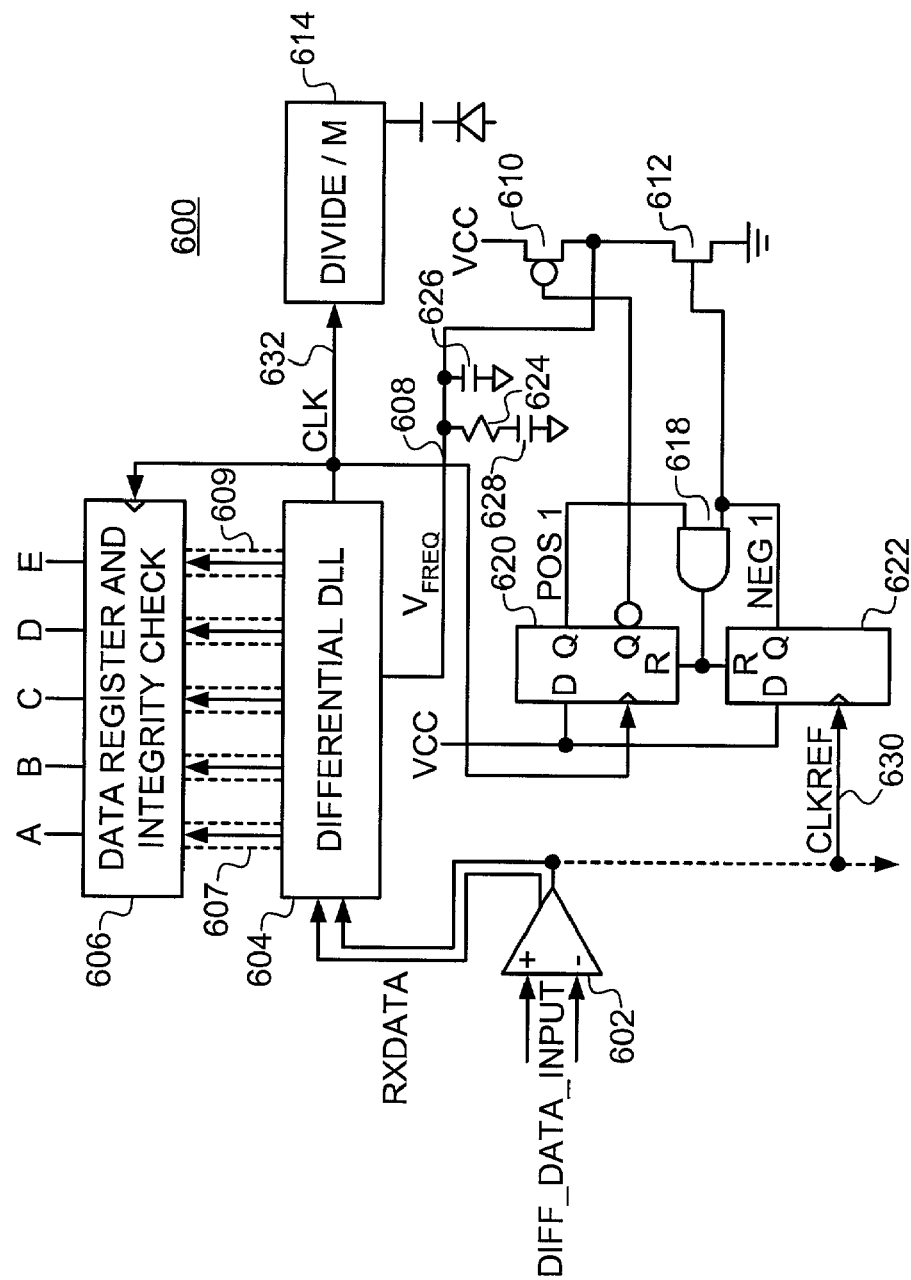
FIG. 6 is a schematic diagram of an example differential receiver according to embodiments of the present invention.

FIG. 6 is a schematic diagram of an example differential receiver 600 according to an embodiment of the present invention. The example differential receiver 600 includes differential amplifier 602, a differential delay-locked loop (DLL) 604, data register and integrity check logic 606, current steering transistors 610 and 612, divide/m logic 614, AND gate 618, registers 620 and 622, a resistance 624, and capacitances 626 and 628.

The differential amplifier 602 receives a differential driving signal from the bus 206, amplifies the differential driving signal, and removes the common mode voltage from the differential driving signal. The differential received data signal (RXDATA) from the differential amplifier is sent to the differential DLL 604 where it is time stretched to where the rising edge 302 corresponds to the rising edge from a differential data output CLK 632. The differential amplifier 602 may provide the RXDATA as a CLKref signal 630 if the driving signal is the first transmission line (or any other bus bit) on the bus 206. This will lock each signal together as a bus to have the same coincidence CLK output from the DLL.

The differential DLL 604 stretches the timing of the RXDATA to a predetermined length. In one embodiment, the differential DLL 604 stretches the timing to coincide with the time between rising edges 302 of the transmitted multiphase encoded waveform. The differential data output CLK 632 also provides a reference clock to cancel routing and trace skew.

The data register and integrity check logic 606 provides a statistical ability to extract the data with high confidence. The data register and integrity check logic 606 or similar logic may perform a probability analysis to determine the likelihood of error in the RXDATA using margin data.

To illustrate, FIG. 6 shows five bits (A, B, C, D, E) passing between the differential DLL 604 and the data register and integrity check logic 606. Each of the five bits (A, B, C, D, E) may be centered to extract a 0,1 pattern from the differential DLL 604. Margin data for each of the five bits (A, B, C, D, E) are the bits to the left and to the right (represented by thee dotted lines 607 and 609, respectively) of each of the five bits (A, B, C, D, E). When there is a change in a bit from what was expected (e.g., an error), the data register and integrity check logic 606 may check the slope of the change by looking to the left and right of each bit to see where a change occurred. If the slope of change is outside a predetermined window of margin, the data register and integrity check logic 606 may substitute the bit to the right or the left for the bit (A, B, C, D, E), as appropriate. Alternatively, the dropping slope of the change may be compared to the rising slope.

If after using the margin data there is no determination that the bits are likely correct, at the end of a frame a resend may be requested and logged. Also each of the bits in question can be flagged for resend, and if there are again errors, a determination as to the non-flagged bits can be extracted from both packets and reassembled.

In one embodiment, a timing length ratio from a rising edge 302 to the rising edge of a differential data output CLK 632 may be determined. The location where the level drops in this relationship may also be determined. If the timing margin changes, data register and integrity check logic 606 or similar logic may calculate a different location for the placement of the rising edge of the differential data output CLK 632 to optimize the RXDATA extraction The differential DLL 604 uses the $V_{freq}$ voltage 608, which sets the delay through the differential DLL 604 to equal the period from the rising edge 302 of the differential data input to the rising edge of the differential data output CLK 632 through the charging or discharging of current steering transistors 610 and 612. The differential DLL 604 taps are in the middle of the transition periods. The AND gate 618, and the registers 620 and 622 provide the biasing timing to enable the steering transistors 610 and 612. To stabilize the Differential DLL for random errors and to track changes in timings, the resistance 624 and the capacitances 626 and 628 provide a filter for the $V_{freq}$ voltage 608.

In some systems, where there is a concern of noise coupling into the differential DLL 604 and the guard rings are not sufficient, the divide/m logic 614 counts down the frequency such that the bias current into the substrate of the differential receiver 600 is set slightly negative. This decreases the inter-chip noise pickup per DLL and PLL stage.

On the receive end, each receiver extracts its own data from the bus 206. The receiver then uses the rising edge 302 in the data as a clock edge to extract the protocol embedded data or commands. This process eliminates clock-to-data skew and jitter because the rising edge 302 was used to format the embedded data that follows the rising edge 302.

These features provide phase alignment for successful data extraction from several optical fibers. These features also allow very wide bandwidths to be achieved without the additional overhead required by conventional 8B/10B encoded systems. This is because multiple fibers to be combined onto the optical bus 206, which moves the data path bottleneck out of the data channel.

Because of limited distance of transmission using copper environments, optical transmission distances can be over 100 or more kilometers. In one embodiment, the multiphase encoded frame may be a central synchronizing clock source on a platform. For example, a platform may include a centralized supervisory device to handle system management and power management functions. The master clock source to the platform may implement a multiphase encoded frame, which also may communicate with devices in the system in the background. Such an embodiment may be used for status reporting and/or requesting, enabling or disabling of devices, fail-over control, and/or power management. In this embodiment, the fixed periodic nature of the multiphase encoded frames' rising edge would be the clock source to the PLLs in the connected devices of the system.

Other functions, such as request buses or functions from a device to grant or provide limited granting of functions, also may be used in this multiphase encoded environment. For example, the clock edge from a centralized clock chip having multiphase encoded frame ability may drive a PLL in each receiving function. The PLL in the receiving function can derive a $V_{freq}$ master voltage. This $V_{freq}$ master voltage can be summed with each local $V_{freq}$. This allows each receiver and transmitter to go to sleep and have the ability to wake up on any incoming transition on any receiver input. A rising edge on the differential data output CLK 632 may be used to toggle a flip-flop to wake up all of the PLLs for transmission and the DLLs for reception.

In one embodiment, different use models can be built using multiphase encoded frames. For example, a clock chip can be combined with arbitration logic to allow signaling of function or commands to be requested and granted while at the same time provide system clocking. The arbitration logic may use data to set priority or it may request status information. The grant lines can respond with status or priority information, including command functions.

In another embodiment, a serial sequence may be used to exchange commands, data, or other information per line, while at all times the clock is sent or provided. A request or command for frequency change may cause the differential receiver 600 to switch to a different differential DLL. Alternatively, a request or command for frequency change may be implemented using different taps on the differential DLL 604 for different frequencies and use models.

In one embodiment, the bus 206 is coupled between the devices (202, 204) to exchange data and control information in multiphase encoded frames. In this embodiment, each frame may be encoded such that multiple phases of the frame allow multiple logic states and their functions to be determined using the initial rising edge of the frame as a synchronizing clock. Each device (202, 206) encodes data prior to transmitting and decodes the encoded data upon receipt.

Each frame is bounded by any two rising edges. The rising edges generate the system clock. The timing location of a falling edge defines the contents of the frame. The frame is subdivided into data zones (e.g., six data zones). Falling edges drop in one of the data zones. The data zones are defined as 00, 01, 10, 11, Command 0, and Command 1. A falling edge is a linear progression from one state to the next state related from the rising edge (clock). A window function may be used to compensate for edge placement uncertainty.

Figure 7:
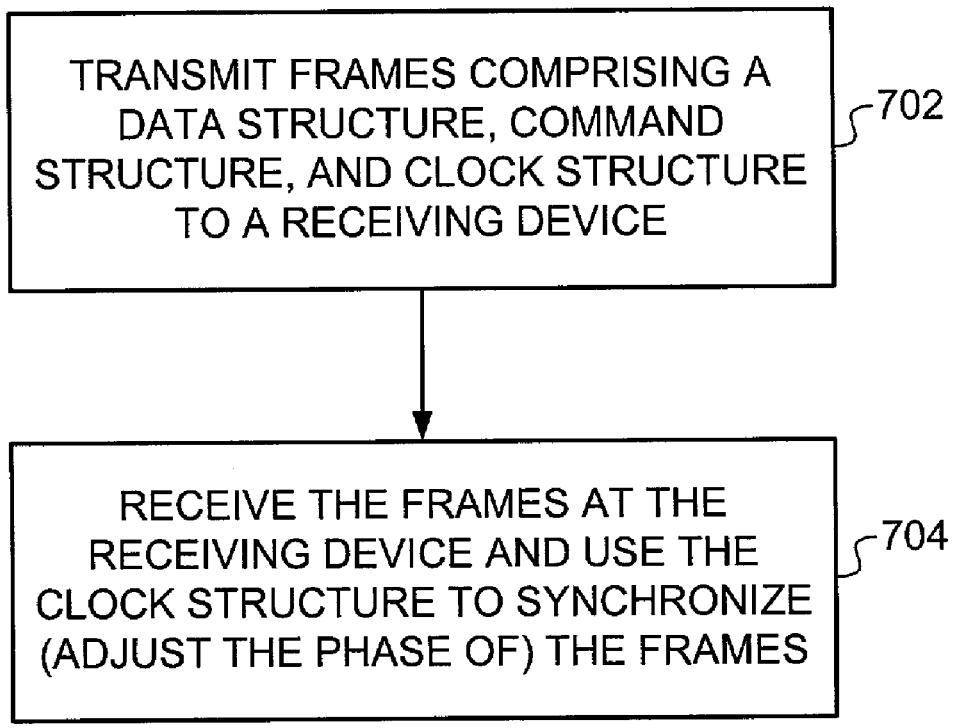
FIG. 7 is a flowchart illustrating a method for implementing optical bus synchronization according to embodiments of the present invention.

FIG. 7 is a flowchart illustrating a method 700 for implementing optical bus synchronization according to embodiments of the present invention. Block 702 transmits frames comprising a data structure, command structure, and a clock structure to a receiving device. The data structure may be encoded with a predetermined number of data field bits and command structure may be encoded with a predetermined number of command/control field bits. The frame may include rising edges and falling edges. The falling edges may indicate that what follows a particular falling edge is either a data structure or a command structure such that dropping the falling edge at one predetermined point in the frame indicates that what follows is a data structure and at another predetermined point. The rising edges indicate the clock structure.

Block 704 receives the frames and used the clock to synchronize the frames with each other. A receiver may extract its data from the frame and use the rising as a clock edge to extract embedded data or command/control information.

FIG. 8 is a schematic diagram of an example N channel complementary metal oxide semiconductor (CMOS) impedance compensation (or matching) circuit 800 suitable for implementing embodiments of the present invention. The example compensation circuit 800 includes an operational amplifier 802, two capacitances 804 and 806, two resistances 808 and 810, a transistor 814, and a package connector 816. The capacitances 804 and 806, and the resistance 808 provide a noise filter for the compensation circuit 800. The resistance 810 is intended to represent the impedance characteristics of the transmission line. VibiasL is the driving voltage for the N-channel transistors, which produce impedance on the driver 600 directly related to the impedance on the transmission line. According to an embodiment, the compensation circuit 800 changes the transistor 814's drive level to cause the current through the resistor 816 to produce $V_{CC}/2$, which may be the biasing voltage VibiasL.

FIG. 9 is a schematic diagram of an example P-channel complementary metal oxide semiconductor (CMOS) impedance compensation (or matching) circuit 900 suitable for implementing embodiments of the present invention. The example compensation circuit 900 includes an operational amplifier 902, two capacitances 904 and 906, two resistances 908 and 910, a transistor 914, and a package connector 916. The capacitances 904 and 906, and the resistance 908 provide a noise filter for the compensation circuit 900. The resistance 910 is intended to represent the impedance characteristics of the transmission line. VibiasH is the driving voltage for the P-channel transistors, which produce impedance on the driver 600 directly related to the impedance on the transmission line. According to an embodiment, the compensation circuit 900 changes drive level of the transistor 914 to cause the current through the resistor 916 to produce $V_{CC}/2$, which may be the biasing voltage VibiasH.

Figure 10:
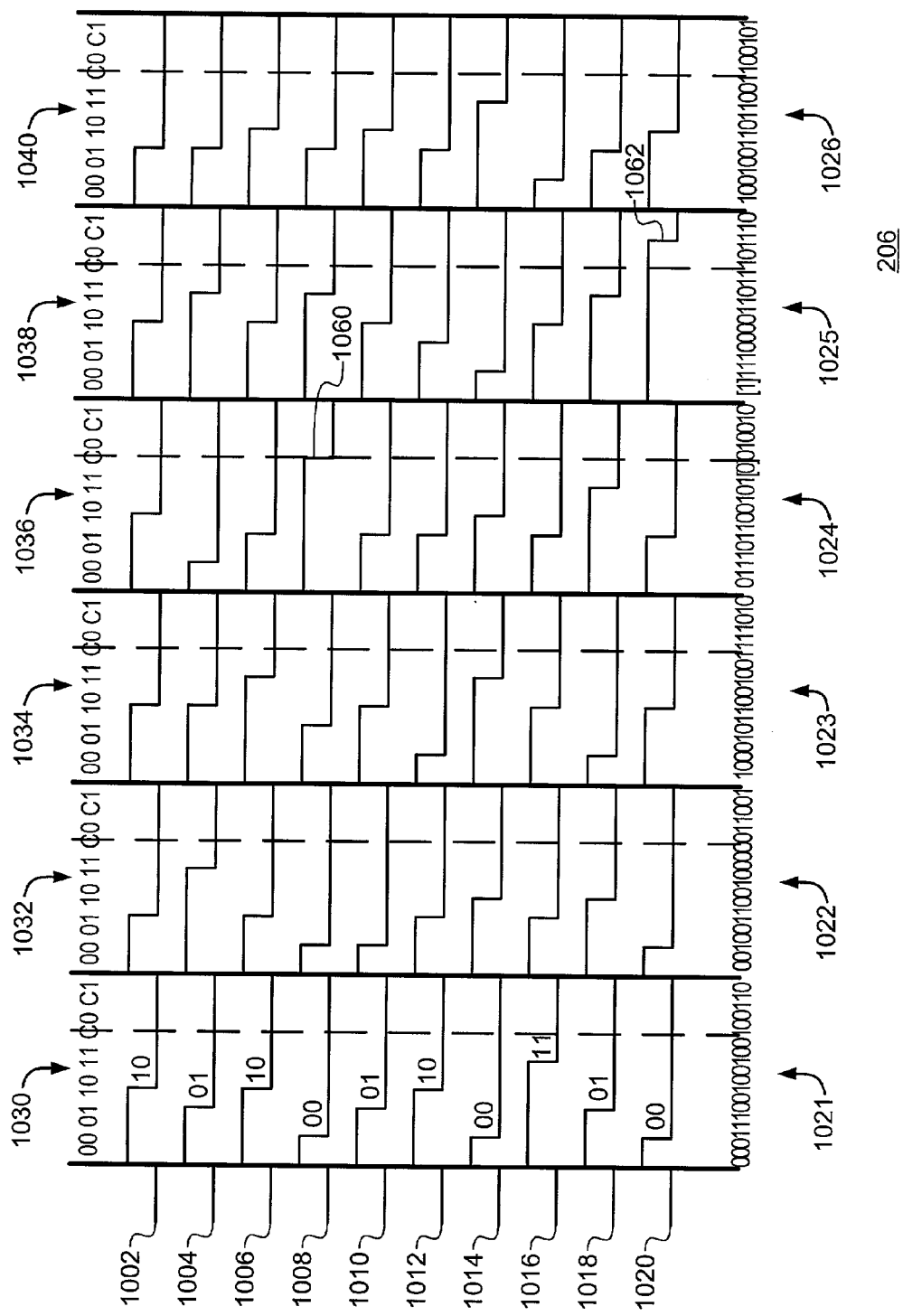
FIG. 10 is a graphical representation illustrating an example of ten decoded seven-phase bit fields according to embodiments of the present invention.

FIG. 10 is a graphical representation illustrating an example of ten channels (or lines) (1002, 1004, 1006, 1008, 1010, 1012, 1014, 1016, 1018, and 1020) on the example bus 206. Each channel includes a data stream, which in the embodiment shown, is made up of multiphase (e.g., seven-phase) encoded frames 1030, 1032, 1034, 1036, 1038, and 1040, which include decoded RXDATA (1021, 1022, 1023, 1024, 1025, and 1026). Each frame has a falling edge, but for ease of explanation, only a few falling edges are described.

Recall from above that the data zone (e.g., 00, 01, 10, 11, Command 0, Command 1) in which a falling edge occurs indicates the type of structure that follows in the Command 0 or Command 1 data zone), then all information on the bus 206 defines a command. In each of the frames 1030, 1032, 1034, and 1040, all falling edges 308 occur in data zones 00, 01, 10, 11, and none occur the data zones Command 0, Command 1. Thus, the bits in the data zones 00, 01, 10, and 11 form a data structure. The data in the data zones 00, 01, 10, and 11 in the frames 1036 and 1038 form a command/control structure because a falling edge in those frames occurs in the data zones Command 0 and Command 1 in the frame 1036 (falling edge 1060) and the frame 1038 (falling edge 1062).

The multiphase encoded protocol and synchronization of bus channels may be implemented on a variety of buses. For example, multiphase encoded protocol and synchronization of bus channels may be implemented on an optical bus, a communications bus, a test bus, and the like. Impedance compensation can be digitized to be stored into registers for processor feedback or modification. Alternatively, digitized impedance compensation may be converted to analog (using a digital-to-analog (D/A) converter, for example) for bias drive potentials. Alternatively still, a bus may be subdivided into one or more different buses going to one or more locations. For example, in an embodiment in which there is a forty field bit bus, six field bits may be directed to a first device, one field bit may be directed to a second device, sixteen field bits may be directed to a third device, one field bit may be directed to a fourth device, and sixteen field bits may be directed to a fifth device. An incoming bus may be reformatted into an input/output (I/O) bus to facilitate this "bus splitting." After reading the description herein, persons of ordinary skill in the art would readily recognize how to implement a multiphase encoded protocol and how to synchronize bus channels on these buses.

Aspects of the invention can be implemented using hardware, software, or a combination of hardware and software. Such implementations include state machines, a field programmable gate array (FPGA), a microprocessor, an application specific integrated circuit (ASIC), discrete medium scale integrated (MSI) circuits, analog circuitry, etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

What is claimed is:

1. A system, comprising:
  a bus;
  first logic having a multiphase phase lock loop to generate a multiphase encoded waveform, the first logic including an input register to receive at least one data word or at least one command/control word, and wherein the command/control word is to indicate whether the multiphase encoded waveform is a data structure or a command/control structure, wherein the bus includes at least one differential transmission line to receive differential signal levels for the multiphase encoded waveform; and
  second logic coupled to the first logic to generate differential signal levels representing the multiphase encoded waveform and wherein the second logic further comprises impedance matching circuitry to match impedance of the second logic to the differential transmission line, the impedance matching circuitry comprising:
    an operational amplifier;
    a first resistor;
    a second resistor;
    a first capacitor;
    a second capacitor; and
    a transistor,
    wherein a first terminal of the first resistor, a first terminal of the second capacitor, and a first terminal of the first capacitor are coupled to a minus input of the operational amplifier, wherein a second terminal of the first capacitor is coupled to ground, wherein a plus input of the operational amplifier is coupled to Vcc/2, wherein a second terminal of the first resistor, a second terminal of the second capacitor, and a first terminal of the resistor are coupled to a first terminal of the transistor, wherein a second terminal of the second resistor is coupled to Vcc, wherein an output terminal of the operational amplifier is coupled to a second terminal of the transistor, and wherein a third terminal of the transistor is coupled to ground, and
  wherein the second logic is further to drive the multiphase encoded waveform onto the bus.

2. The system of claim 1 wherein the input register comprises a first-in-first-out (FIFO) register.

3. The system of claim 1, further comprising third logic coupled to the bus to receive the multiphase encoded waveform.

4. The system of claim 3 wherein the third logic includes an amplifier to receive differential signal levels representing the multiphase encoded waveform from the bus and extract the multiphase encoded waveform from the received differential signal levels.

5. The system of claim 4 wherein the third logic includes a differential delayed lock loop coupled to stretch a multiphase encoded waveform timing to a predetermined length.

6. The system of claim 5 wherein the third logic includes a register coupled to check data integrity of the multiphase encoded waveform.

7. An apparatus, comprising:
  a device driver having first logic to generate a multiphase encoded waveform and second logic coupled to the first logic to drive the multiphase encoded waveform onto a bus, wherein the bus includes at least one differential transmission line to receive differential signal levels for the multiphase encoded waveform, wherein second logic includes third logic to generate differential signal levels representing the multiphase encoded waveform, the second logic further to generate differential signal levels representing the multiphase encoded waveform, the second logic further comprising impedance matching circuitry to match impedance of the second logic to the differential transmission line, the impedance matching circuitry comprising:
    an operational amplifier;
    a first resistor;
    a second resistor;
    a first capacitor;
    a second capacitor; and
    a transistor,
    wherein a first terminal of the first resistor, a first terminal of the second resistor, and a first terminal of the capacitor are coupled to a minus input of the operational amplifier, wherein a second terminal of the first capacitor is coupled to ground, wherein a plus input of the operational amplifier is coupled to Vcc/2, wherein a second terminal of the first resistor, a second terminal of the second capacitor, and a first terminal of the second resistor are coupled to a first terminal of the transistor, wherein a second terminal of the transistor is coupled to Vcc, wherein an output terminal of the operational amplifier is coupled to a second terminal of the transistor, and wherein a third terminal of the transistor is coupled to ground, and
    wherein the first logic includes a command/control signal input, wherein a command/control signal on the command/control signal input is to indicate whether the multiphase encoded waveform is a data structure or a command/control structure.

8. The apparatus of claim 7 wherein the first logic includes a multiphase phase lock loop to generate multiple phases for the multiphase encoded waveform.

9. The apparatus of claim 8 wherein the first logic includes an input register, coupled to the multiphase phase lock loop, to receive at least one data word or at least one command/control word.

10. The apparatus of claim 9 wherein the input register comprises a first-in-first-out (FIFO) register.

11. An apparatus, comprising:
  a device driver to receive a multiphase encoded waveform, having:
    an amplifier to receive differential signal levels representing the multiphase encoded waveform from the bus, wherein the bus includes at least one differential transmission line to receive signal levels for the multiphase encoded waveform, and extract the multiphase encoded waveform from the received differential signal levels;

a differential delay-lock loop coupled to stretch the received multiphase encoded waveform timing to a predetermined length, wherein the differential delay-lock loop includes logic to align rising edges of the received multiphase encoded waveform to rising edges of a transmitted multiphase encoded waveform; and logic to generate the differential signal levels representing the multiphase encoded waveform, the logic comprising impedence matching circuitry to match impedance of the logic to the differential transmission line, the impedance matching circuitry comprising:

an operational amplifier;
a first resistor;
a second resistor;
a first capacitor;
a second capacitor; and
a transistor, wherein a first terminal of the first resistor, a first terminal of the second resistor, and a first terminal of the first capacitor are coupled to a minus input of the operational amplifier, wherein a second terminal of the first capacitor is coupled to ground, wherein a plus input of the operational amplifier is coupled to Vcc/2, wherein a second terminal of the first resistor, a second terminal of the second capacitor, and a first terminal of the second resistor are coupled to a first terminal of the transistor, wherein a second terminal of the transistor is coupled to Vcc, wherein an output terminal of the operational amplifier is coupled to a second terminal of the transistor, and wherein a third terminal of the transistor is coupled to ground.

12. The apparatus of claim 11, further comprising a register coupled to check data integrity of the received multiphase encoded waveform.

13. The apparatus of claim 12 wherein the register includes logic to extract data bits from the received multiphase encoded wavrform and to perform a probability analysis to determine a likelihood of errors.

* * * * *